United States Patent
Martin (10) Patent No.: US 10,254,422 B2
(45) Date of Patent: *Apr. 9, 2019

(54) STEERABLE FAIRING STRING

(71) Applicant: GX Technology Canada Ltd., Calgary (CA)

(72) Inventor: Daniel George Martin, Woodstock (CA)

(73) Assignee: GX Technology Canada Ltd., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,701

(22) Filed: Apr. 21, 2017

(65) Prior Publication Data

US 2017/0299747 A1    Oct. 19, 2017

Related U.S. Application Data (63) Continuation of application No. 14/353,075, filed as application No. PCT/CA2012/000996 on Oct. 26, 2012, now Pat. No. 9,632,195.

(60) Provisional application No. 61/552,652, filed on Oct. 28, 2011.

(51) Int. Cl.
*G01V 1/38* (2006.01)
*B63B 21/66* (2006.01)

(52) U.S. Cl.
CPC ............ *G01V 1/3826* (2013.01); *B63B 21/66* (2013.01); *B63B 21/663* (2013.01)

(58) Field of Classification Search
CPC ...... G01V 1/3826; B63B 21/663; B63B 21/66
USPC .................................................... 367/16–18
See application file for complete search history.

(56) References Cited

U.S. PATENT DOCUMENTS

| | | | |
|---|---|---|---|
| 2,435,956 | A | 2/1948 | Craig |
| 3,943,483 | A | 3/1976 | Strange |
| 4,180,935 | A | 1/1980 | Goudey et al. |
| 4,365,574 | A | 12/1982 | Norminton |
| 4,404,664 | A | 9/1983 | Zachariadis |

(Continued)

FOREIGN PATENT DOCUMENTS

| | | |
|---|---|---|
| DE | 3933398 A1 | 4/1991 |
| EP | 0884607 A2 | 12/1998 |

(Continued)

OTHER PUBLICATIONS

International Search Report and Written Opinion dated Jun. 23, 2017 in connection with International Patent Application No. PCT/IB2017/000209, 11 pages.

(Continued)

*Primary Examiner* — Ian J Lobo
(74) *Attorney, Agent, or Firm* — Dorsey & Whitney LLP (57) ABSTRACT

A foil having a leading edge, trailing edge, chord and span is attached between a first head float position and bottom submerged position below the head float on the array. The foil being flexible along its span and has a first interior conduit rearward of the leading edge and a second interior conduit forward of the trailing edge. The conduits are centered on the chord and separated by a distance. A first cable having a first length is strung inside the first conduit and a second cable having a second length is strung inside the second conduit, and an adjustment mechanism is used to vary the length of the first cable relative to the length of the second cable and vice versa.

20 Claims, 10 Drawing Sheets

(56) References Cited

U.S. PATENT DOCUMENTS

| | | | |
|---|---|---|---|
| 4,484,534 A | 11/1984 | Thillaye due Boullay | |
| 4,514,924 A | 5/1985 | Ojserkis et al. | |
| 4,567,841 A | 2/1986 | Hale | |
| 4,823,325 A | 4/1989 | Cole, Jr. | |
| 4,829,929 A | 5/1989 | Kerfoot | |
| 6,016,286 A | 1/2000 | Olivier et al. | |
| 6,131,327 A | 10/2000 | Larsen | |
| 6,144,342 A | 11/2000 | Bertheas et al. | |
| 6,189,475 B1 | 2/2001 | Coakley | |
| 6,226,225 B1 | 5/2001 | Barker et al. | |
| 6,504,792 B2 | 1/2003 | Barker et al. | |
| 6,532,189 B2 | 3/2003 | Barker | |
| 6,655,311 B1 | 12/2003 | Martin et al. | |
| 6,671,223 B2 | 12/2003 | Bittleston | |
| 6,691,038 B2 | 2/2004 | Zajac et al. | |
| 6,837,175 B1 * | 1/2005 | Gieseke | G01V 1/3826 114/242 |
| 6,932,017 B1 | 8/2005 | Bittleston et al. | |
| 7,080,607 B2 | 7/2006 | Bittleston et al. | |
| 7,162,967 B2 | 1/2007 | Bittleston et al. | |
| 7,222,579 B2 | 5/2007 | Bittleston et al. | |
| 7,293,520 B2 | 11/2007 | Bittleston et al. | |
| 7,380,513 B2 | 6/2008 | Lie | |
| 7,404,370 B2 | 7/2008 | Stokkeland | |
| 7,499,373 B2 | 3/2009 | Toennessen | |
| 7,577,060 B2 | 8/2009 | Toennessen et al. | |
| 7,738,317 B2 | 6/2010 | Toennessen | |
| 7,755,970 B2 | 7/2010 | Welker et al. | |
| 7,793,606 B2 | 9/2010 | Olivier et al. | |
| 8,230,801 B2 | 7/2012 | Bittleston et al. | |
| 8,391,101 B2 | 3/2013 | Brewer et al. | |
| 8,391,102 B2 | 3/2013 | Holo et al. | |
| 8,593,905 B2 | 11/2013 | Gagliardi et al. | |
| 8,743,655 B2 | 6/2014 | Bittleston et al. | |
| 8,897,094 B2 | 11/2014 | Brewer et al. | |
| 8,997,675 B2 | 4/2015 | MacQuin et al. | |
| 9,075,165 B2 | 7/2015 | Vageskar et al. | |
| 9,151,859 B2 | 10/2015 | Martin | |
| 9,211,940 B2 | 12/2015 | Richer De Forges | |
| 9,221,524 B2 | 12/2015 | Richer De Forges | |
| 9,244,184 B2 | 1/2016 | Voldsbekk | |
| 9,244,187 B2 | 1/2016 | Berentzen et al. | |
| 9,494,703 B2 | 11/2016 | Mork et al. | |
| 9,632,195 B2 * | 4/2017 | Martin | B63B 21/66 |
| 2006/0176775 A1 | 8/2006 | Toennessen | |
| 2008/0029012 A1 | 2/2008 | Stokkeland | |
| 2010/0149910 A1 | 6/2010 | Martin | |
| 2010/0226204 A1 | 9/2010 | Gagliardi et al. | |
| 2011/0103179 A1 | 5/2011 | Vageskar et al. | |
| 2011/0203509 A1 | 8/2011 | Austad et al. | |
| 2012/0067265 A1 | 3/2012 | Valø et al. | |
| 2013/0182531 A1 | 7/2013 | Galgiardi et al. | |
| 2014/0104985 A1 | 4/2014 | Gagliardi et al. | |
| 2014/0247691 A1 | 9/2014 | Martin | |
| 2014/0247692 A1 | 9/2014 | Simonnot | |
| 2014/0269174 A1 | 9/2014 | Gagliardi et al. | |
| 2015/0268366 A1 | 9/2015 | Vageskar et al. | |
| 2016/0161622 A1 | 6/2016 | Martin | |
| 2017/0106946 A1 | 4/2017 | Schneider | |
| 2017/0184749 A1 | 6/2017 | McKey, III et al. | |
| 2018/0027784 A1 | 2/2018 | Martin | |

FOREIGN PATENT DOCUMENTS

| | | |
|---|---|---|
| EP | 2776863 B1 | 2/2015 |
| ES | 1018874 U | 2/1992 |
| GB | 108761 A | 8/1917 |
| GB | 282520 A | 12/1927 |
| GB | 682349 A | 11/1952 |
| GB | 693238 A | 6/1953 |
| GB | 2342081 A | 4/2000 |
| GB | 2400662 B | 10/2004 |
| WO | 1995/016344 A1 | 6/1995 |
| WO | 2010111377 A2 | 9/2010 |
| WO | 2013059926 A1 | 5/2013 |
| WO | 2014145861 A1 | 9/2014 |
| WO | 2016086293 A1 | 6/2016 |
| WO | 2016127245 A1 | 8/2016 |

OTHER PUBLICATIONS

Extended European Search Report dated Sep. 16, 2015 in connection with European Patent Application No. 12844247.2, 5 pages.
International Preliminary Report on Patentability dated Apr. 29, 2014 in connection with International Patent Application No. PCT/CA2012/000996, 4 pages.
International Search Report and Written Opinion dated May 2, 2013 in connection with International Application No. PCT/CA2012/000996, 6 pages.
Patent Examination Report No. 1 dated Jun. 24, 2014 in connection with Australian Patent Application No. 2012327836, 2 pages.
International Search Report and Written Opinion dated Jan. 24, 2017 in connection with International Patent Application No. PCT/US2016/057344, 13 pages.
International Search Report and Written Opinion dated Feb. 22, 2016 in connection with International Patent Application No. PCT/CA2015/000593, 7 pages.
First Office Action dated Aug. 10, 2015 in connection with Danish Patent Application No. PA 2014 00278, 7 pages.
Second Office Action dated Mar. 1, 2016 in connection with Danish Patent Application No. PA 2014 00278, 2 pages.
First examination report dated Jul. 9, 2018 in connection with Danish Patent Application No. PA201770675, 5 pages.
Examination report dated Jul. 31, 2018 in connection with Canadian patent application No. 2,856,316, 4 pages.
Extended European Search Report dated Oct. 9, 2018 in connection with European Patent Application No. 16748506.9, 11 pages.
Second Examination Report dated Jan. 18, 2019 in connection with Danish Patent Application No. PA201770675, 4 pages.

* cited by examiner

DIRECTION OF TRAVEL

FIG. 12

DIRECTION OF TRAVEL

STEERABLE FAIRING STRING

CROSS-REFERENCE TO RELATED APPLICATIONS

This application is a continuation of U.S. patent application Ser. No. 14/353,075 filed 21 Apr. 2014 entitled "Steerable Fairing String," which is a national stage filing of PCT/CA2012/000996 filed 26 Oct. 2012, which claims priority to U.S. Provisional Patent Application No. 61/552,652 filed 28 Oct. 2011. Each of these applications is incorporated by reference herein in its entirety and for all purposes.

FIELD

The invention relates to seismic arrays and an apparatus and method for maintaining required spacing between sub-arrays and streamer cables, as the case may be that are towed behind a vessel.

BACKGROUND

Seismic arrays consisting of source arrays and receiver arrays are used to study the strata of the rock structure below the ocean surface. To survey a specific area of the ocean floor, an exploration vessel is used to tow source and/or receiver arrays along a specified path covering the desired surface area of the ocean floor. The source and receiver arrays are used to obtain relevant geological data. Typically a single surface vessel will simultaneously tow both the source and receiver arrays, but sometimes an exploration vessel will only tow either the source array or receiver array. Other times, only a source array is towed while the receiver array is deployed on the ocean floor and remains stationary.

Figure 3:
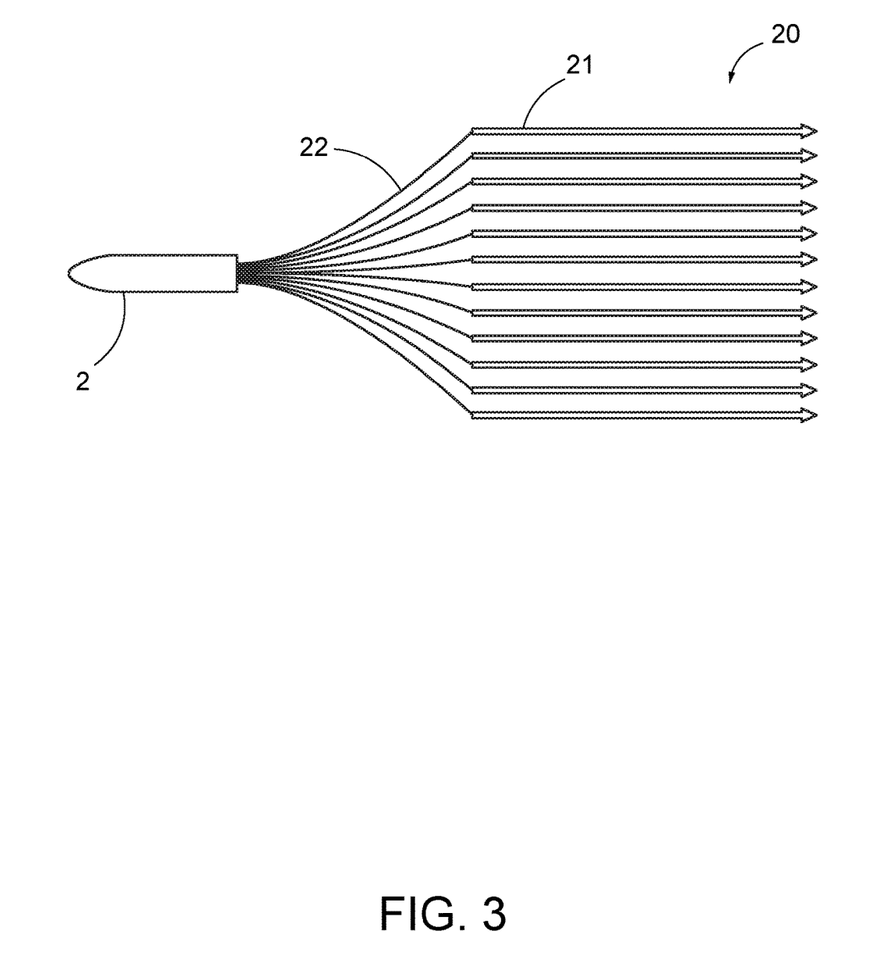
FIG. 3 is a top schematic illustration of an exploration vessel towing a seismic receiver array.

A prior art seismic receiver array is shown in FIG. 3 comprising multiple streamer cables typically ranging in length from approximately 1500 to 9000 meters. Each streamer cable is adapted with hydrophone groupings spaced at regular intervals along the length of the streamer cable. The streamer cables are deployed below the ocean surface at a specified depth or depths.

During operation, the acoustic shock wave generated by the source array penetrates the ocean floor and is reflected back. The reflected acoustic signatures are recorded by the hydrophone groupings in the streamer cables for subsequent analysis.

A seismic exploration vessel is generally capable of simultaneously towing both a source array and a receiver array. Importantly, lateral spreading forces must be applied to maintain the required spacing between the sub-arrays and streamer cables as they are towed behind the vessel. The required spacing depends, inter alia, on the number of streamer cables deployed and the interstitial spacing required between adjacent cables.

Typically, the air gun sub-arrays may be spread out laterally over a distance of approximately 12.5 to 100 meters, and the streamer cables over a distance of approximately 100 to 1500 meters.

A common method of achieving the required lateral spacing between sub-arrays and streamer cables is to deploy a divertor or paravane on a dedicated towing rope from the exploration vessel. A string of separation ropes are used to daisy-chain one streamer cable to the next to achieve the desired spacing between the streamer cables.

A number of approaches are employed to reduce the towing drag forces generated. Examples of such methods are the use of small diameter cables, high efficiency paravanes and the use of conventional cable fairings on separation ropes and lead-in cables. The prior art cable fairings utilize a single rope threaded through the nose of the fairing to allow the fairing to self-align with the direction of flow by way of free-swiveling.

Various methods of controlling the position of the towed equipment have been proposed to increase the quality of the seismic data being generated. One such method, for example, is the use of controllable foils or birds secured at approximately 300 meter intervals along the length of each streamer cable. The controllable foils are used to maintain the equipment at both a desired depth profile and a desired lateral offset throughout the length of the streamers.

SUMMARY

One object of the disclosed technology is to provide an apparatus and method for steering of the equipment towed behind an exploration vessel to achieve improved positional control of source and receiver arrays thereby increasing data quality.

Another object of the disclosed technology is to reduce the overall towing burden or associated drag resulting from equipment towed behind an exploration vessel.

An object of the disclosed technology in the field of marine seismic arrays is to eliminate the requirement for paravanes, dedicated paravanes, tow ropes, and separation ropes used to maintain the required lateral spacing between sub-arrays and streamer cables. In addition, the need for associated deck equipment including, for example, paravane winches and davits, and separation rope storage reels is eliminated. In one exemplary implementation, the foil is used to replace a forward suspension rope in a source array and a float tagline in a receiver array.

In one exemplary implementation, a fairing may be configured for attachment within a marine seismic array to provide lateral hydrodynamic lift to a component of the marine seismic array. The fairing may include a foil, two conduits, and two cables. The foil may have a leading edge and a trailing edge and defining a chord length and a span length. A first interior conduit may be oriented along the span length aft of the leading edge. A second interior conduit may be oriented along the span length forward of the trailing edge, parallel to the first interior conduit, and separated by a distance from the first interior conduit. A first cable may have a first length extending within the first conduit. A second cable may have a second length extending within the second conduit.

In one embodiment, the foil may be asymmetrical in cross section and is in the shape of an air foil. In another embodiment, the first and second conduits may be offset to either side of the chord. In other embodiments, depressors may be attached at the top and bottom ends of the foil. In another exemplary embodiment, the foil may be divided into a plurality of discreet segments either abutting one another or attached to one another.

In another exemplary implementation, a marine seismic survey system is disclosed and may include a marine seismic array configured for towing behind a marine vessel and a fairing configured for attachment within the marine seismic array to provide lateral hydrodynamic lift to a component of the marine seismic array. The fairing may include a foil, two conduits, and two cables. The foil may have a leading edge and a trailing edge and defining a chord length and a span length. A first interior conduit may be oriented along the span length aft of the leading edge. A second interior conduit may be oriented along the span length forward of the trailing edge, parallel to the first interior conduit, and separated by a distance from the first interior conduit. A first cable may have a first length extending within the first conduit. A second cable may have a second length extending within the second conduit.

In a further implementation, a method for steering a component of a marine seismic array is provided. A fairing may be attached to the component. The fairing may include a foil, two conduits, and two cables. The foil may have a leading edge and a trailing edge and defining a chord length and a span length. A first interior conduit may be oriented along the span length aft of the leading edge. A second interior conduit may be oriented along the span length forward of the trailing edge, parallel to the first interior conduit, and separated by a distance from the first interior conduit. A first cable may have a first length extending within the first conduit. A second cable may have a second length extending within the second conduit. The method may continue by submersively positioning the fairing. The first length of the first cable, the second length of the second cable, or both, may be adjusted such that the first length is different from the second length to curve a profile of the foil and provide lateral hydrodynamic lift to the component of the marine seismic array.

Further features of the invention as claimed will be described or will become apparent in the course of the following detailed description.

BRIEF DESCRIPTION OF THE DRAWINGS

In order that the claimed invention may be more clearly understood, embodiments thereof will now be described in detail by way of example, with reference to the accompanying drawings, in which:

DETAILED DESCRIPTION

Figure 1:
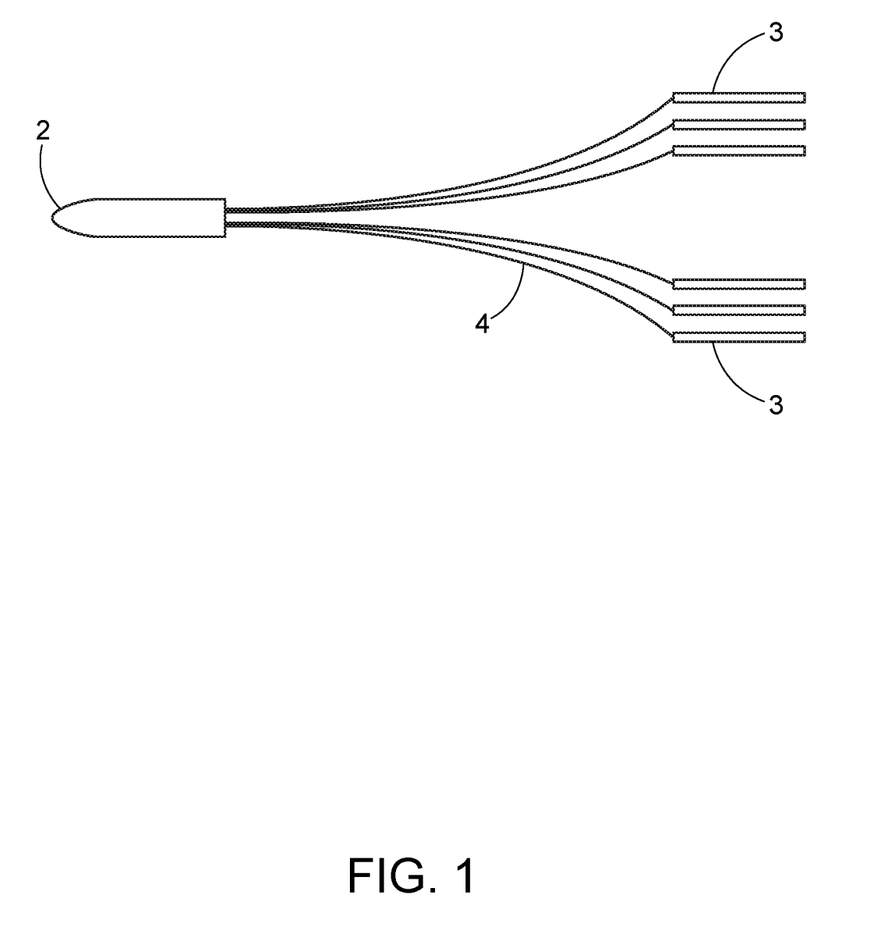
FIG. 1 is a top schematic illustration of an exploration vessel towing port and starboard source arrays.
Figure 2:
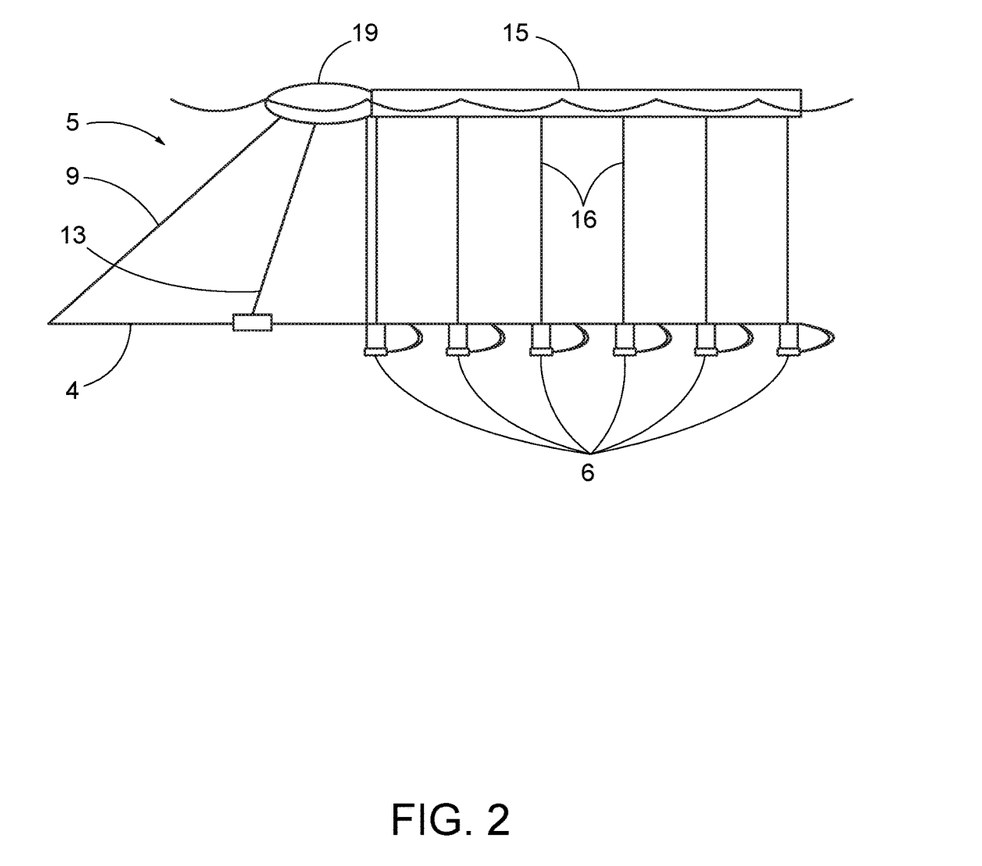
FIG. 2 is a side schematic illustration of a sub-array.

A prior art seismic dual source array 3 towing configuration is schematically shown by way of example in FIGS. 1 and 2 having three sub-arrays on each side. High pressure air guns 6 are used to generate an acoustic shock wave. Each sub-array 3 is towed by an umbilical cable 4 and comprises a head float 19, a tail float 15, air guns 6, a forward suspension rope 13, suspension ropes 16, and a tow leader 9.

As shown in FIG. 2, a tow leader 9 is provided to prevent the head float 19 and tail float 15 of the air gun sub-array 5 from being pushed aft by the towing drag forces exerted on the sub-array and to maintain the suspension ropes 16 in a vertical orientation. The suspension ropes 16 are preferably maintained in a vertical orientation to ensure a consistent geometry for the air gun sub-array 5 since the depth of the air guns 6 below the surface is determined by the length of the suspension ropes 16.

Figure 4:
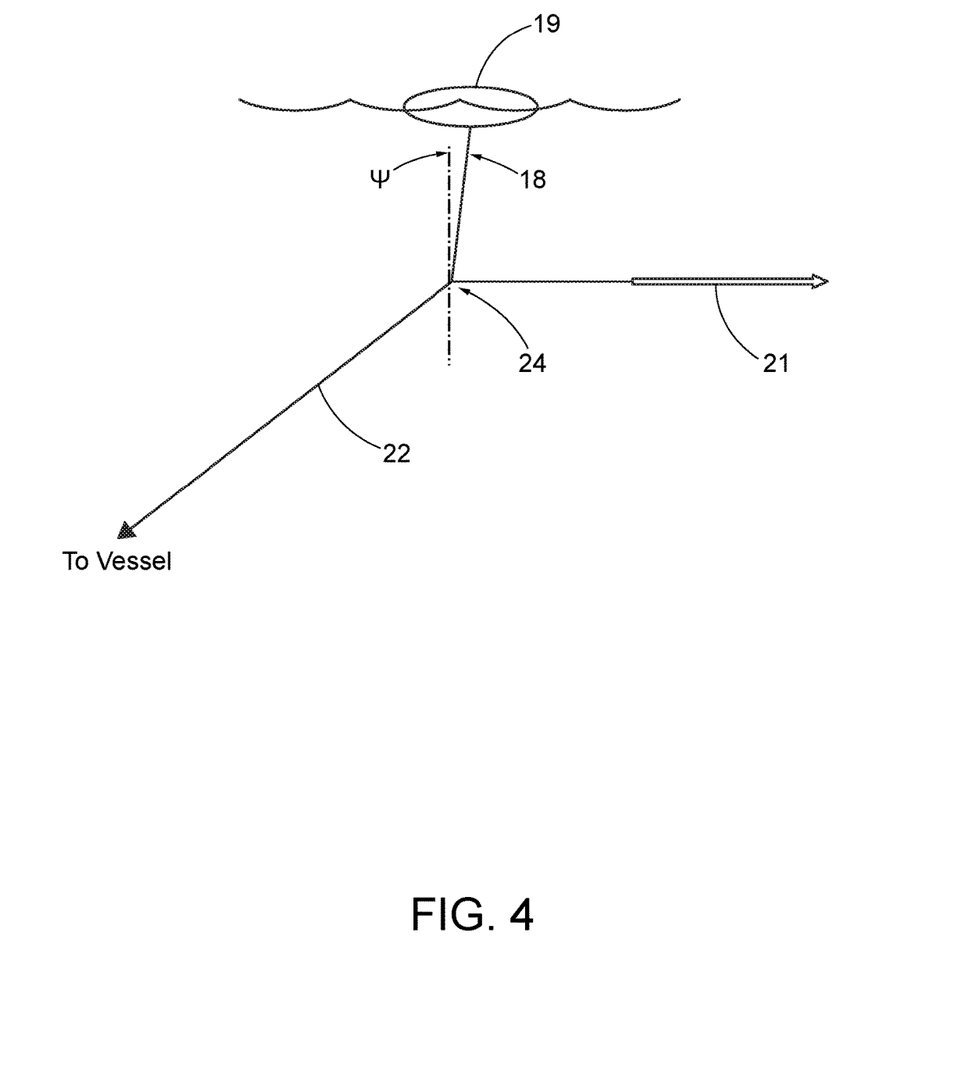
FIG. 4 is a partial side schematic illustration of a seismic array.

A prior art seismic receiver array 20 is shown in FIG. 3 comprising multiple streamer cables 21 typically ranging in length from approximately 1500 to 9000 meters. Each streamer cable 21 is adapted with hydrophone groupings spaced at regular intervals along the length of the streamer cable 21. The streamer cables 21 are deployed below the ocean surface at a specified depth or depths. As shown in FIG. 4, head floats 19 are used to support lead-in cables 22 above the connection point between the lead-in cables 22 and the streamer cables 21 by means of float taglines 18. The length of the float tagline controls the depth of the lead-in cable 22 at the connection point 24. As shown in FIG. 4, drag towing forces acting on the head float 19 may cause the float tagline to be pulled out of a vertical position above the connection point and assume a small layback angle $\psi$.

During operation, the acoustic shock wave generated by the source array 3 penetrates the ocean floor and is reflected back. The reflected acoustic signatures are recorded by the hydrophone groupings in the streamer cables 21 for subsequent analysis.

A seismic exploration vessel 2 is generally capable of simultaneously towing both a source array 3 and a receiver array 20. Importantly, lateral spreading forces must be applied to maintain the required spacing between the sub-arrays 5 and streamer cables 21 as they are towed behind the vessel. The required spacing depends, inter alia, on the number of streamer cables 21 deployed and the interstitial spacing required between adjacent cables.

Typically, the air gun sub-arrays 5 may be spread out laterally over a distance of approximately 12.5 to 100 meters, and the streamer cables 21 over a distance of approximately 100 to 1500 meters.

According to the present invention a steerable fairing string or foil is provided as part of the rigging for marine seismic arrays. In general a fairing string comprises as an immersed foil shaped flexible string which generates hydrodynamic steering forces, port or starboard as may be required, to thereby control the desired spacing between elements of the seismic array.

A fairing string (hereinafter used interchangeably as wing section or foil) 1 according to one embodiment of the present invention is shown in cross section in FIG. 7. The fairing string 1 has a leading edge 7, trailing edge 8, chord 17 and two rope or cable receiving conduits running the length of the span. The conduits are provided for stringing cables or ropes between the head float and a submerged position on the towed array as will be hereafter described.

A forward conduit 10 is located in the leading edge section of the fairing centered on the chord 17 and receives a forward suspension rope 13. An aft conduit 12 is located in the trailing edge centered on the chord section of the fairing and receives an aft suspension rope 14. Preferably the distance between the conduits is maximized such that the conduits are located as forward or aft as possible. The free rotation of the fairing string 1 about the forward suspension rope 13 is thus restricted according to the present invention by the aft suspension rope 14. Together the ropes are used to effect steering of the fairing string 1 as will be described hereafter.

According to one embodiment of the present invention, one continuous span of fairing is threaded from end to end with the forward and aft suspension ropes 14. The fairing, forward suspension rope 13, and aft suspension rope 14 collectively form a fairing string 1. Alternatively, a plurality of discrete fairing segments each having shortened span may be threaded onto the suspension ropes with zero or nominal spacing between each segment. The adjacent fairing segments may be connected to each other chain-like by way of linkages known in the art at various locations such as the leading edge, trailing edge and mid-chord. Alternatively, adjacent fairing segments can simply abut each other with no interconnecting linkages used.

The fairing string is flexible along its length and will assume a curved profile for generating hydrodynamic lift forces. The suspension ropes offers no bending resistance. Thus, a preferred material for the foil is, for example, a plastic polyurethane that offers low cost and light weight. Rigid materials can be also be used for a chain-like segmented foil which will equally curve.

Figure 5:
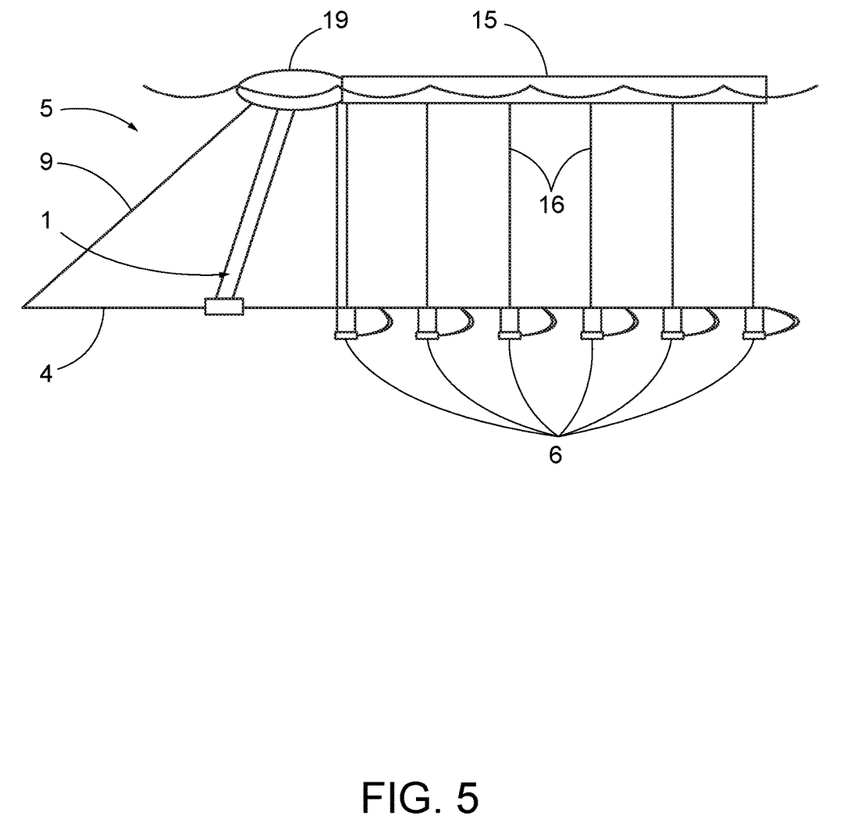
FIG. 5 is the schematic illustration of FIG. 2 with a steerable fairing string according to the present invention.
Figure 6:
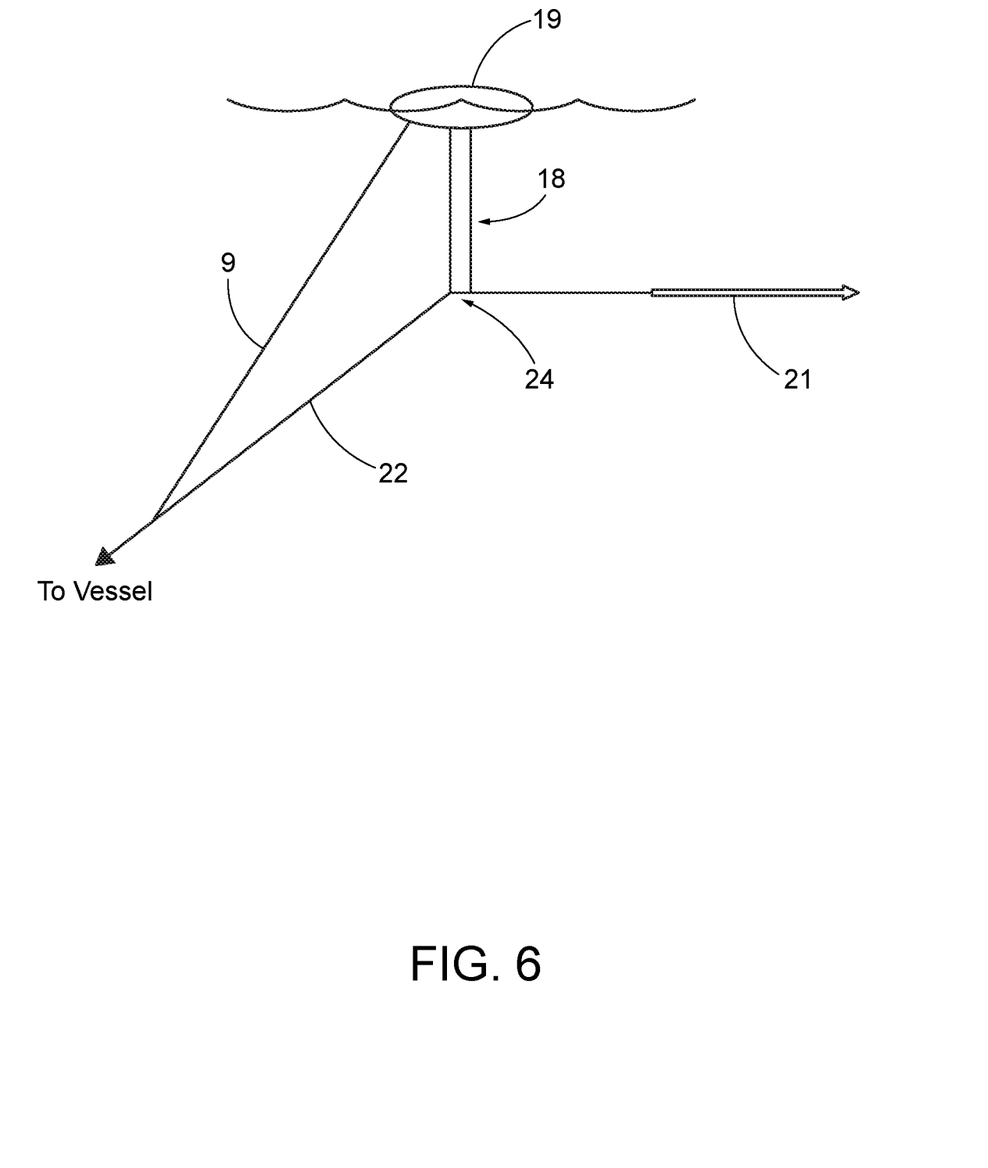
FIG. 6 is the schematic illustration of FIG. 4 with a fairing string according to the present invention.

According to the present invention, the fairing string 1 is used to replace the forward suspension rope 13 of the air gun sub-array 5 as shown in FIG. 5 or the float tagline 18 as shown in FIG. 6. In this position, the use of the fairing string 1 provides a mechanism for generating hydrodynamic lift forces to achieve desired lateral positioning of the towed equipment within the overall array. As well, the suspension ropes threaded through the fairing string are adjustable such that the fairing string can be used to provide steering forces to control the dynamic positioning of the air gun sub-arrays 5 and streamer cables 21 towed behind the exploration vessel 2.

Figure 8:
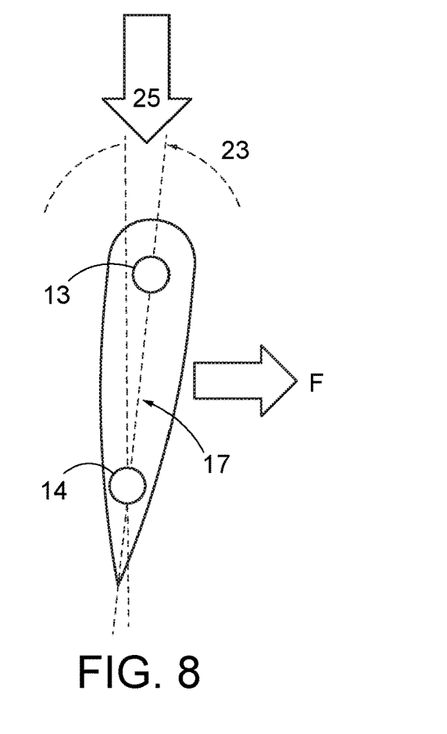
FIG. 8 is a cross-sectional view of a fairing string illustrating an angle of attack.

A suitably installed control device may be located either at the top end of the fairing string or at the bottom end of the fairing string to vary and control the angle of attack 23 between the central axis or chord 17 of the fairing string 1 and the direction of flow 25 shown in FIG. 8. The control device is used to selectively vary the length in either of the suspension ropes to thereby lengthen or shorten the relative rope lengths between the ends of the fairing string 1 and thereby effect steering of the fairing string 1. For example, the length of the aft suspension rope 14 may be adjusted in relation to the length of the forward suspension rope 13 or vice versa to effect differential length control.

Figure 15:
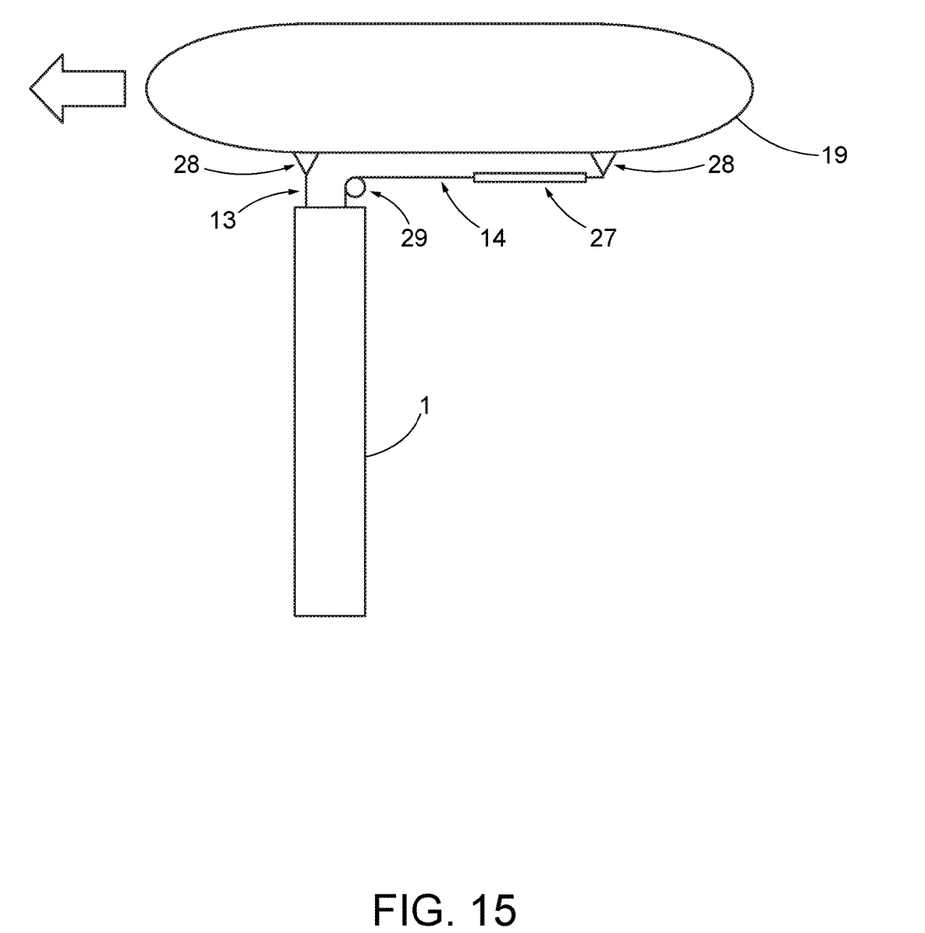
FIG. 15 is a schematic illustration of a pulley adjustment mechanism.

Examples of adjustment mechanisms that can be used include a standard turnbuckle 27 pulley arrangement 29 installed between the top end of the aft suspension rope 14 and an anchor point on the aft section of the head float 19 as schematically illustrated in FIG. 15. Alternatively, a ratchet winch can be used. For automated adjustment of the rope, an electric solenoid may be used. Other control options include a hydraulically or pneumatically controlled ram and piston, an electric winch, or a motor driving a rack and pinion.

Figure 7:
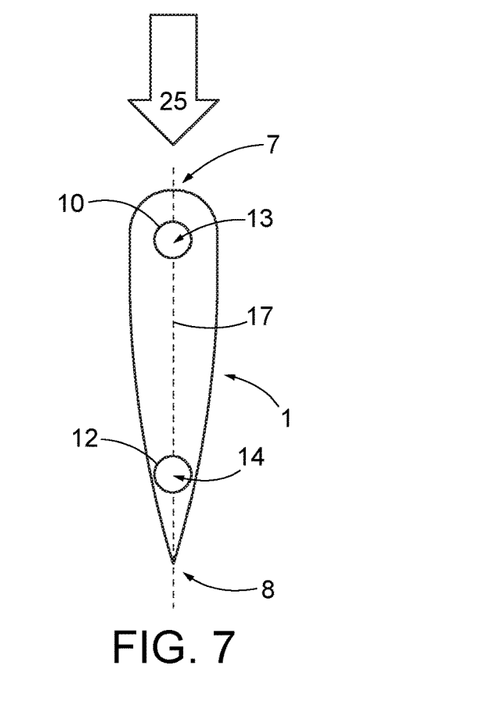
FIG. 7 is a cross-sectional view of a fairing string.

FIG. 7 illustrates the central axis or chord 17 of the fairing string 1 aligned with the direction of flow 25 indicating a 0° angle of attack. The forward suspension rope 13 is held at a length that is at least equal to the length of the aft suspension rope 14.

Increasing the length of the forward suspension rope 13 relative to the length of the aft suspension rope 14 will permit the leading edge of the fairing string 1 to rotate with reference to the trailing edge of the fairing string 1 to thereby take on an angle of attack 23 in response to hydrodynamic lifting force F exerted on the fairing string 1 by the flow as shown in FIG. 8.

FIG. 8 illustrates an angle of attack 23 and resultantly the generation of the lift or steering forces. The direction of the lift or steering forces are indicated by arrow F. The magnitude of the generated lift forces are proportional to the angle of attack 23. It is by this means of control that the fairing string 1 is steered. In particular, small adjustments in relative length of the ropes is highly effective in varying the angle of attack of the fairing string 1 and controlling steering forces.

As lift force is generated, the flexible fairing string will take on a half-wave sinusoidal profile along its span hereinafter called the "billow" effect. Since the forward suspension rope 13 is slightly longer than the aft suspension rope 14 in order to generate lift F, the amplitude of the sine wave of the forward suspension rope 13 is slightly greater than the amplitude of the aft suspension rope 14. The net effect of this difference in amplitude is that a slight twist develops along the length of the fairing string, such, the angle of attack exhibited near the ends of the fairing string 1 is relatively small, increasing to a maximum angle of attack at the midpoint of the fairing string 1. Resultantly, the center portion of the fairing string 1 generates more lift than end portions of the fairing string 1.

To improve steering control a preferred fairing string with an asymmetrical cross section may be used that generates lift forces at a 0° angle of attack. Thus, the fairing string 1 will always rotate in one direction only. An example of an asymmetrical foil cross section is a NACA 2318 although other reasonably selected NACA, Gottingen or Eppler cross sections may be used. Alternatively, the conduits for the forward and aft suspension ropes may be offset from each other in relation to the chord 17 to achieve the same purpose.

Figure 9:
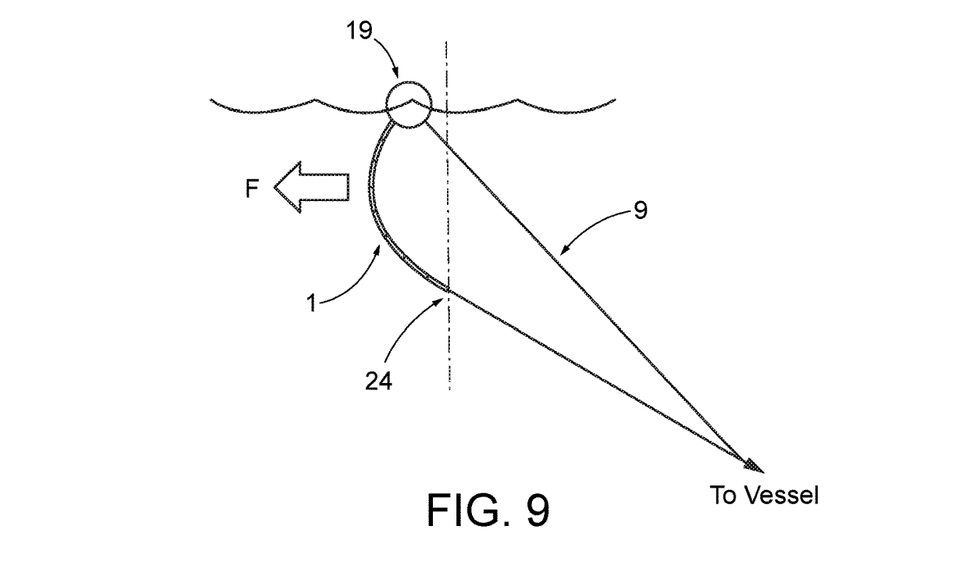
FIG. 9 is a front schematic illustration of FIG. 6.
Figure 10:
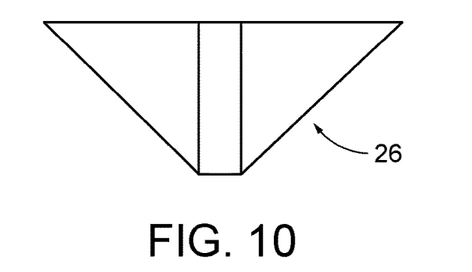
FIG. 10 is a top view of a depressor.
Figure 11:
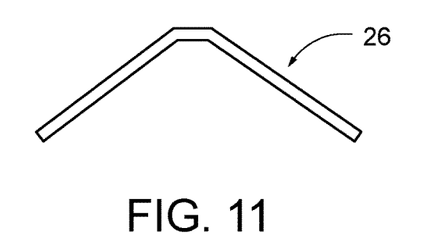
FIG. 11 is a front view of a depressor.
Figure 12:
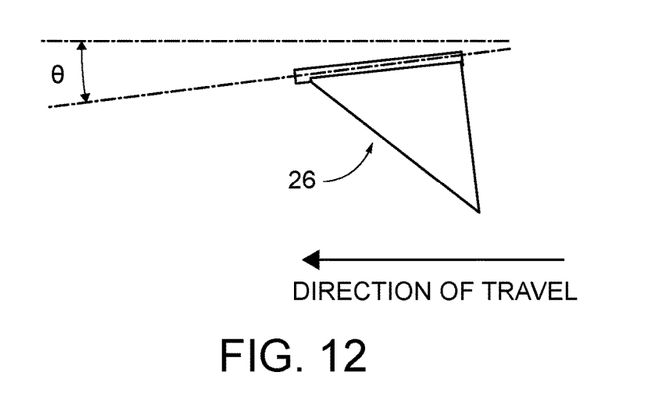
FIG. 12 is a side view of a depressor in the bottom position.
Figure 13:
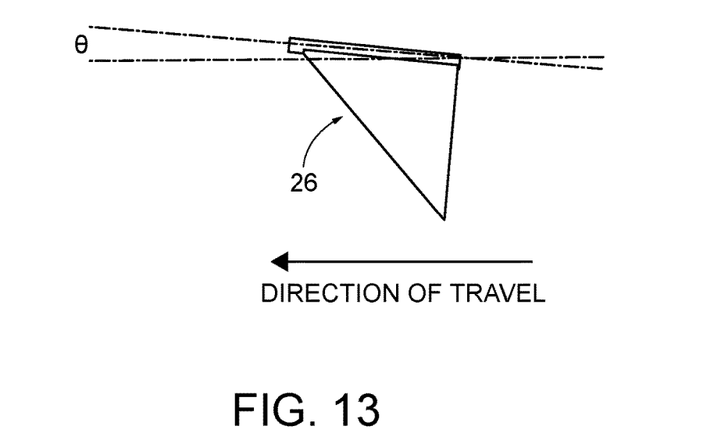
FIG. 13 is a side view of a depressor in the top position.
Figure 14:
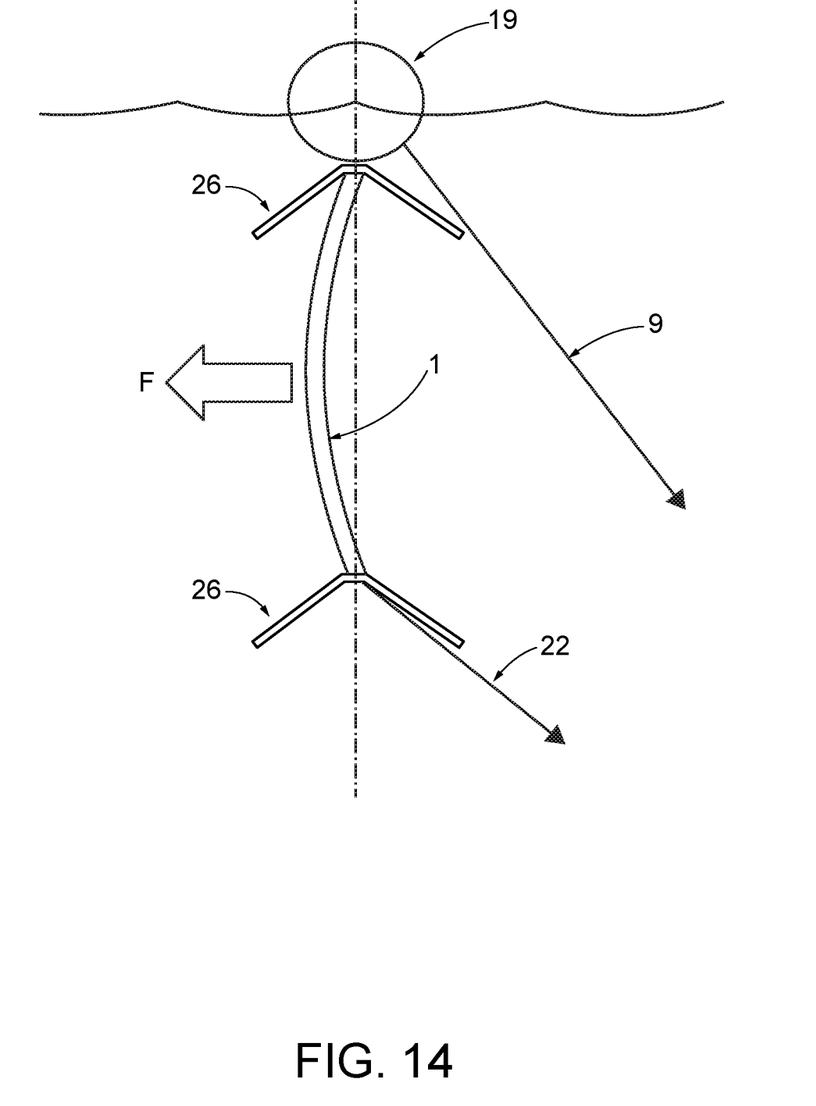
FIG. 14 is a schematic illustration of the fairing string with depressors installed at the top and bottom end of the fairing string.

In the application of the present invention to a float tagline 18 descending from a head float 19, as shown in FIGS. 6 and 9, the addition of a tow leader 9 may be necessary to counteract the tendency of the head float 19 to move outboard from the vertical and rearward resulting from the generated lift forces and towing drag forces. The tow leader 9 would limit the outboard movement and minimizes the layback angle ψ as shown in FIG. 4, ensuring maximum lift efficiency of the fairing string 1.

The billow effect results in a force being generated at the top end of the fairing string 1 that acts in a downward direction and a force being generated at the bottom end of the fairing string 1 that acts in an upward direction. To counteract the effect of these vertical forces and their tendency to move the ends of the fairing string 1 upward or downward, depressors may be used.

As shown in FIGS. 10-14, depressors 26 may be attached at the top and bottom ends of the fairing string 1 to counteract the above described forces. A preferred example of a depressor 26 is a delta wing hydrofoil which generates a downward force or an upward force depending upon the depression angle θ for which it is rigged.

The forces generated by the two depressors 26 are proportional to the tow speed of the exploration vessel 2 in the same manner as the lift forces F generated by the fairing string 1 are proportional to the tow speed of the exploration vessel 2. Resultantly, the opposing depressors 26 act to maintain a constant amount of billow in the fairing string 1 profile regardless of towing speed of the exploration vessel 2. Thus, the use of depressors 26 is one optional means of counteracting the vertical forces induced by the billow effect if required.

Other techniques may be optionally used in order to improve the control of the amount of lift generated by the fairing string 1. These include varying the chord length of the foil, specifying the length of suspension ropes and the length of fairing string 1 to be installed overtop of the suspension ropes, varying the degree of camber or asymmetry to the fairing foil shapes to be used at time of deployment and specifying the number of fairing strings 1 to be deployed per lead-in cable, or per source sub-array.

To facilitate an automated or remotely controllable fairing string 1 communication with the individual steerable fairing strings 1 can be achieved via a direct radio link between the exploration vessel 2 and a control device located in the head float of the sub-array or lead-in cable. Alternatively, communication can be achieved via direct electrical or optical connections through the umbilical or lead-in cables, or via underwater acoustic modems. Monitoring of the position of the fairing string 1 may be accomplished through conventional means such as, for example, GPS beacons on the surface floats or acoustic bracing using underwater pingers.

The preferred application of the present invention is to marine seismic arrays. Other applications include electromagnetic surveys, ocean bottom node surveys, or any other oceanographic application which requires towed equipment to be positioned behind the tow vessel.

Other advantages which are inherent to the invention are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A fairing configured for attachment within a marine seismic array to provide lateral hydrodynamic lift to a component of the marine seismic array, the fairing comprising:
    a foil having a leading edge and a trailing edge and defining a chord length and a span length;
    a first interior conduit oriented along the span length aft of the leading edge;
    a second interior conduit oriented along the span length forward of the trailing edge, parallel to the first interior conduit, and separated by a distance from the first interior conduit;
    a first cable having a first length extending within the first conduit; and
    a second cable having a second length extending within the second conduit.

2. The fairing of claim 1, wherein the foil defines an asymmetrical foil cross section on opposing sides of a plane defining the chord length through the foil.

3. The fairing of claim 1, wherein the foil comprises a plurality of discrete foil segments having segment span lengths arranged serially along the first and second cables, wherein a sum of the segment span lengths defines the span length of the foil.

4. The fairing of claim 1, wherein the first and second conduits are centered on a plane defining the chord length through the foil.

5. The fairing of claim 1, wherein the first and second conduits are offset to either side of a plane defining the chord length through the foil.

6. The fairing of claim 1, wherein the first length of the first cable is longer than the second length of the second cable.

7. The fairing of claim 1 further comprising an adjustment mechanism to vary the second length of the second cable relative to the first length of the first cable or vice versa.

8. The fairing of claim 7, wherein
    the first cable and the second cable are a single length of cable;
    a first portion of the single length of cable defining the first cable is positioned within the first interior conduit and is fixed at the first length with respect to the first interior conduit;
    a second portion of the single length of cable defining the second cable is positioned within the second interior conduit; and
    the adjustment mechanism is configured to vary the second length of the second portion of the single length of cable within and with respect to the second interior conduit.

9. The fairing of claim 1, wherein a diameter of the first interior conduit is larger than a diameter of the first cable such that the fairing can rotate about the first cable within the first interior conduit.

10. A method for steering a component of a marine seismic array comprising:
    attaching a fairing to the component, the fairing comprising
        a foil having a leading edge and a trailing edge and defining a chord length and a span length;
        a first interior conduit oriented along the span length aft of the leading edge;
        a second interior conduit oriented along the span length forward of the trailing edge, parallel to the first interior conduit, and separated by a distance from the first interior conduit;
        a first cable having a first length extending within the first conduit; and
        a second cable having a second length extending within the second conduit; submersively positioning the fairing;
    adjusting the first length of the first cable, the second length of the second cable, or both, such that the first length is different from the second length to curve a profile of the foil and provide lateral hydrodynamic lift to the component of the marine seismic array.

11. The method of claim 10, wherein the adjusting step adjusts the first length of the first cable, the second length of the second cable, or both, such that the second length is shorter than the first length.

12. The method of claim 10, wherein the adjusting step further comprises creating a billow in the foil such that an angle of attack of the foil forms at a minimum near opposing ends of the span length and increases to a maximum at the midpoint of the span length.

13. The method of claim 10 further comprising:
    rotating the leading edge of the foil about the first cable; and
    maintaining a position of the trailing edge with respect to the second cable such that the leading edge rotates with respect to the trailing edge.

14. A marine seismic survey system comprising:
    a marine seismic array configured for towing behind a marine vessel;
    a fairing configured for attachment within the marine seismic array to provide lateral hydrodynamic lift to a component of the marine seismic array, the fairing comprising
        a foil having a leading edge and a trailing edge and defining a chord length and a span length;

a first interior conduit oriented along the span length aft of the leading edge;

a second interior conduit oriented along the span length forward of the trailing edge, parallel to the first interior conduit, and separated by a distance from the first interior conduit;

a first cable having a first length extending within the first conduit; and a second cable having a second length extending within the second conduit.

15. The marine seismic survey system of claim 14, wherein the marine seismic array comprises a seismic source array.

16. The marine seismic survey system of claim 14, wherein the marine seismic array comprises a seismic receiver array.

17. The marine seismic survey system of claim 14, wherein the foil defines an asymmetrical foil cross section on opposing sides of a plane defining the chord length through the foil.

18. The marine seismic survey system of claim 14, wherein the foil comprises a plurality of discrete foil segments having segment span lengths arranged serially along the first and second cables, wherein a sum of the segment span lengths defines the span length of the foil.

19. The marine seismic survey system of claim 14 further comprising an adjustment mechanism to vary the second length of the second cable relative to the first length of the first cable or vice versa.

20. The marine seismic survey system of claim 19, wherein the first cable and the second cable are a single length of cable;

a first portion of the single length of cable defining the first cable is positioned within the first interior conduit and is fixed at the first length with respect to the first interior conduit;

a second portion of the single length of cable defining the second cable is positioned within the second interior conduit; and the adjustment mechanism is configured to vary the second length of the second portion of the single length of cable within and with respect to the second interior conduit.

* * * * *